United States Patent [19]

Watt et al.

[11] Patent Number: 4,934,449
[45] Date of Patent: Jun. 19, 1990

[54] AIR INTAKE SYSTEM FOR AN AGRICULTURAL IMPLEMENT

[75] Inventors: John D. Watt, Naperville; Robert A. Matousek, Minooka; Harold C. Oban, Darien, all of Ill.

[73] Assignee: J. I. Case Company, Racine, Wis.

[21] Appl. No.: 207,161

[22] Filed: Jun. 15, 1988

[51] Int. Cl.⁵ .................. F28F 13/08; F28F 19/00
[52] U.S. Cl. .................. 165/41; 165/95; 165/109.1; 165/119; 55/269; 55/290; 55/295; 55/461; 180/68.1
[58] Field of Search .................. 165/41, 109.1, 119, 165/95; 55/268, 269, 290, 295, 306, 461; 180/68.1

[56] References Cited

U.S. PATENT DOCUMENTS

| | | | |
|---|---|---|---|
| 2,728,411 | 12/1955 | Pasturczak | 165/119 |
| 3,309,847 | 3/1967 | Donaldson | 165/41 |
| 3,565,203 | 2/1971 | Ashton | 55/269 |
| 3,816,981 | 6/1974 | Carnewal et al. | |
| 3,837,149 | 9/1974 | West et al. | |
| 4,053,293 | 10/1977 | Combs | 55/269 |
| 4,099,942 | 7/1978 | Carnewal et al. | |
| 4,153,436 | 5/1979 | Cozine et al. | 55/290 |
| 4,233,040 | 7/1980 | Vogelaar et al. | |
| 4,443,236 | 4/1984 | Peiler | 55/269 |
| 4,514,201 | 4/1985 | Brown | 180/68.1 |

FOREIGN PATENT DOCUMENTS

| | | | |
|---|---|---|---|
| 2810594 | 5/1979 | Fed. Rep. of Germany | 165/119 |
| 3416810 | 11/1985 | Fed. Rep. of Germany | 165/119 |
| 1425464 | 2/1976 | United Kingdom | 165/119 |

OTHER PUBLICATIONS 2 pages from John Deere Company catalog, John Deere Harvester Works, OM-H124052, Issue J6 (no date).

*Primary Examiner*—John Ford
*Attorney, Agent, or Firm*—Dressler, Goldsmith, Shore, Sutker & Milnamow, Ltd.

[57] ABSTRACT

An air intake system for an agricultural implement having a mobile frame, an internal combustion engine carried by the frame, a heat exchanger defining front and rear planar faces, an engine driven fan and a walled structure enclosing the engine, heat exchanger and fan. The walled structure defines a screened air inlet through which environmental air is drawn upon operation of the fan. An air plenum directs environmental air between the air inlet and the front face of the heat exchanger. The heat exchanger is mounted proximate to the fan toward one end of the air plenum. A bypass channel arranged adjacent the heat exchanger directs environmental air around the heat exchanger and exhausts a downstream of the rear face of the heat exchanger. Foreign material, carried in the environmental air, is likewise directed around the heat exchanger whereby preventing relatively rapid plugging of the heat exchanger.

9 Claims, 4 Drawing Sheets

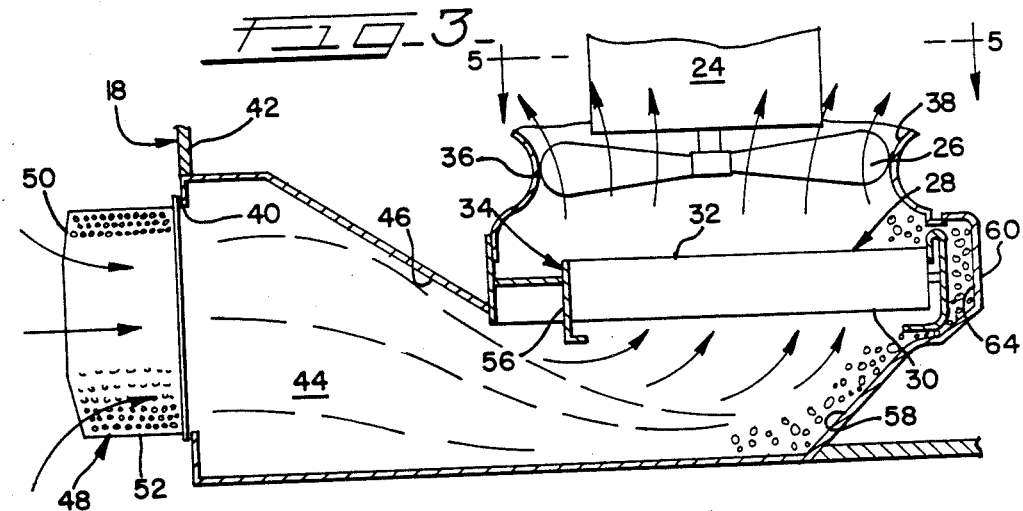
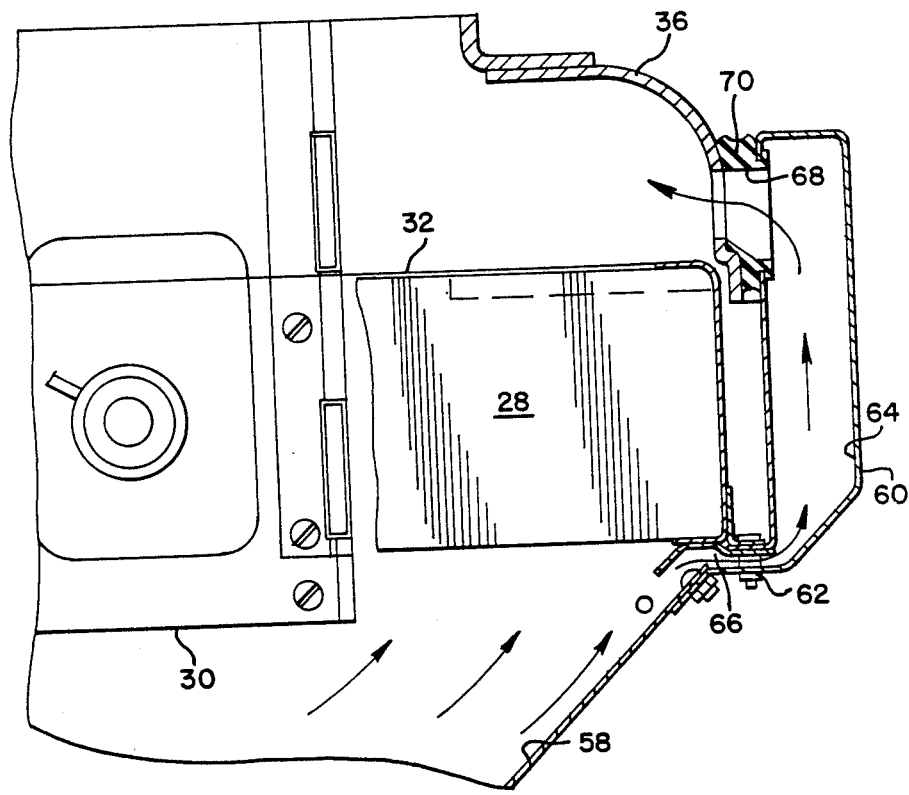

Fig-5-
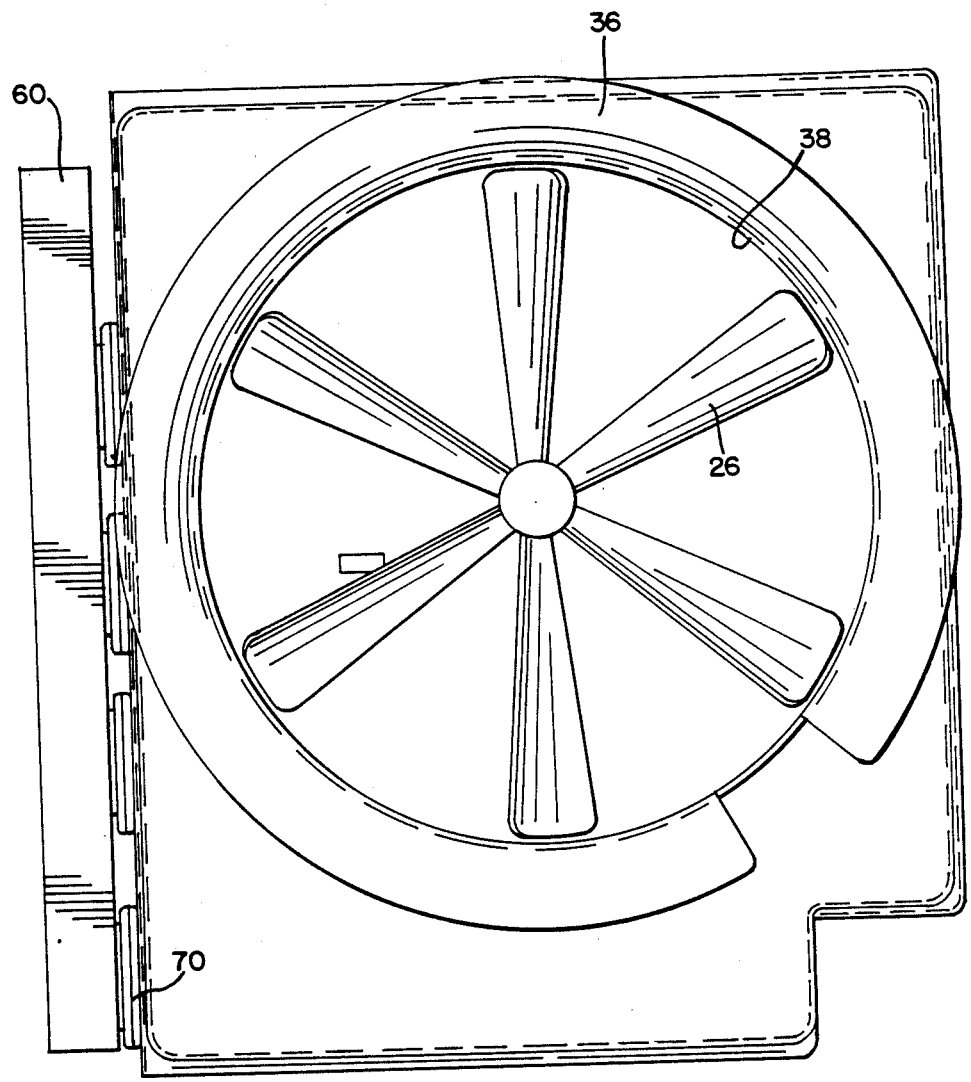

AIR INTAKE SYSTEM FOR AN AGRICULTURAL IMPLEMENT

FIELD OF THE INVENTION

This invention relates to agricultural implements and, more particularly, to an air intake system for an agricultural implement arranged to minimize accumulation of dirt and other debris on a radiator of the implement's cooling system.

BACKGROUND OF THE INVENTION

Today's agricultural equipment including mobile harvesting machines, such as combines and the like, are aesthetically designed without detracting from their usefulness. To effect such ends, an engine for such harvesting machines is usually enclosed in a walled structure. Also mounted within the walled structure is a heat exchanger, such as a radiator, for cooling the engine. An engine driven fan is provided to draw a large volume of environmental air across the radiator in heat exchanging relationship therewith.

Combines and the like are typically operated in extremely dirty and dusty conditions. Accordingly, it is conventional to provide screens or filters for removing relatively large pieces of foreign material, such as chaff and leaves, from the air drawn toward the radiator. Since the combine is working in a dirty environment, keeping the screen or filter clean has presented a serious problem.

Various solutions to the problem have been proposed One type of well known filtering system features the use of an apertured rotary screen with baffles. The baffles are arranged adjacent an interior side of the screen to blank off a section of the screen as the screen rotates. The baffles effectively cut off the inward air flow in the area of the screen opposite the baffle so that the trash or foreign material drawn against the baffled screen area is allowed to fall off the screen.

The above system, however, has not been totally satisfactorily in eliminating the problem of foreign materials in the environmental air drawn toward the radiator. Openings in the screen must be sized large enough to allow a large volume of air to be drawn into heat exchanging relation with the radiator. The size of such openings, however, also allows dirt and other foreign material to pass through the screen and be deposited upon a front face of the radiator or heat exchanger core.

As will be understood, an accumulation of foreign material on a front face of the radiator core ultimately causes blockage or plugging of air flow through the radiator. Depending upon harvesting conditions, the operator may have to frequently stop to clean the radiator core so as to prevent overheating of the engine. In some conditions, blockage or plugging of the radiator core occurs in a relatively short time adding frustration and valuable time to the harvesting operation.

The specific orientation of the radiator within a machine can affect the above debris accumulation. Specifically, some engine configurations require positioning of the radiator so that cooling air is forced to change direction in its flow path toward the radiator. The effects of inertia on debris thus results in more pronounced accumulation at the downstream most portion of the radiator.

In view of the above, it would be desirable to have an air intake system for an agricultural implement wherein the interval between radiator core cleaning operations could be extended to allow the machine to be used to its optimum capacity.

SUMMARY OF THE INVENTION

In view of the above, and in accordance with the present invention, there is provided an air intake system for an agricultural implement which allows the implement to be used in dusty, dirty conditions and substantially extends radiator core cleaning intervals. This is achieved by providing a bypass around the radiator core which is positioned such that airborne debris tends to flow through the bypass, thus abating its accumulation on fin surfaces of the radiator.

The air intake system of the present invention is arranged in combination with an agricultural implement having a mobile frame including a walled enclosure defining an air inlet opening. The agricultural implement is powered by an internal combustion engine which is carried by the frame within the walled enclosure. The engine has a heat exchanger defining generally planar front and rear faces. The engine further includes a driven fan which is operable to draw environmental air through the air inlet opening and toward the front planar face of the heat exchanger.

In accordance with one aspect of the invention, the air intake system includes an air plenum for directing an environmental air flow between the air inlet opening and the heat exchanger. The heat exchanger is mounted proximate to the engine fan and toward one end of the air plenum.

A salient feature of the present invention concerns the provision of means for allowing environmental air to bypass the heat exchanger and be exhausted rearwardly of the rear face of the heat exchanger. The bypass means of the present invention further allows foreign material which passes through the screen and is carried in the environmental air to bypass the heat exchanger. By allowing some foreign material to bypass the heat exchanger, such bypass means diminishes the amount of foreign material which can plug or cause blockage of the front face of the heat exchanger.

In one form of the invention, such bypass means includes a radiator bypass assembly which is preferably secured to a radiator mounting bracket toward an outside wall of the radiator. The bypass assembly defines a bypass chamber for directing environmental air around the radiator core to a location downstream of the rear face of the radiator.

The air plenum associated with the present invention is a venturi-like walled structure which has a decreasing cross section area in the direction of air flow. The air plenum is designed such that foreign material, of sufficient surface area for its mass, carried in the environmental air will be deflected toward an outside wall of the structure during its flow toward the heat exchanger. As such, the foreign material will readily be drawn into the bypass chamber of the radiator bypass assembly.

In accordance with another aspect of the invention, there is provided an air intake system for a mobile agricultural implement having a frame which supports a liquid, cooled internal combustion engine. A walled enclosure is also mounted on the frame for enclosing at least part of the engine. One of the walls in the enclosure defines an air inlet. An engine driven fan draws environmental air in through the air inlet. A radiator, defining front and rear planar faces across which the environmental air passes in a heat exchanging relationship, is arranged in combination with the engine.

The air intake system includes an air plenum for directing environmental air from the air inlet to the front face of the radiator. Radiator support means arranges the radiator on the frame in front of the engine fan and toward a downstream end of the air plenum.

The radiator support means defines a bypass channel which allows environmental air to bypass the radiator core and be exhausted downstream of the rear face of the radiator. The bypass channel exhausts environmental air downstream of the rear face of the radiator in a manner preventing relatively rapid radiator plugging of the front face of the radiator.

In a preferred form of the invention, the radiator support means mounts the front face of the radiator such that it is substantially orthogonal to the direction of air flow in the air plenum. The air plenum is a walled structure having a decreasing cross section area in the direction of air flow to impart a relatively high velocity to the environmental air flowing downstream in the air plenum. The air plenum may further include a deflector sheet arranged toward a downstream end thereof for directing environmental air toward the front face of the radiator.

To retard the build-up of foreign material on the front face of the radiator, the air inlet is covered by a rotating screen. Moreover, a freely rotatable blade is arranged proximate the front face of the radiator. This freely rotatable blade is rotated by an air flow in the air plenum and induces a turbulent flow of air in the area proximate the front face of the radiator in a manner retarding the accumulation or build-up of foreign material on the front face of the radiator.

Other features and advantages of the present invention will become readily apparent from the following detail description, the appended claims, and the accompanying drawings.

BRIEF DESCRIPTION OF THE DRAWINGS

FIG. 3 is a top plan view, partially in section, schematically illustrating an air intake system according to the present invention;

FIG. 4 is an enlarged top plan view illustrating details of one embodiment of an air intake system according to the present invention;

FIG. 5 is a rear elevational view as seen along line 5—5 of FIG. 3; and

DETAILED DESCRIPTION

Figure 1:
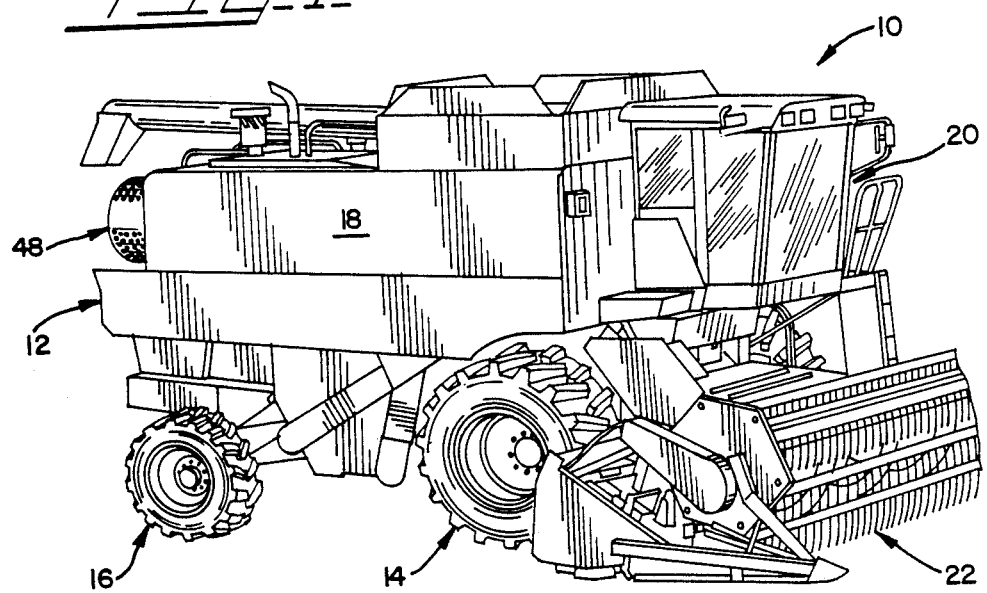
FIG. 1 is a right front perspective view of a combine embodying principles of the present invention.
Figure 2:
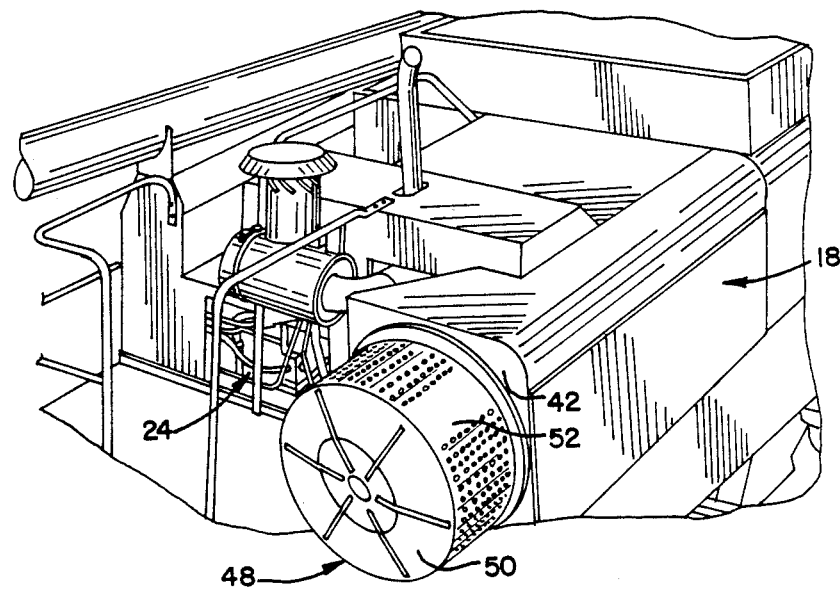
FIG. 2 is a rear perspective view of a portion of the combine illustrated in FIG. 1.

While the present invention is susceptible of embodiments in various forms, there is shown in the drawings, and will hereinafter be described, presently perferred embodiments of the invention with the understanding that the present enclosure is to be considered as an exemplification of the invention, and is not intended to limit the invention to the specific embodiments illustrated.

Referring now to the drawings, wherein like reference numerals indicate like parts throughout the several views, the invention is embodied in a self propelled combine 10. The combine 10 has a main body or frame 12 mounted on a pair of front drive wheels 14 and a pair of steerable rear wheels 16. The main body or frame includes a walled enclosure 18 and an operator's station 20 disposed forward of the enclosure 18. A harvesting header assembly 22 or other suitable device is attached to the frame preferably forward of the operator's station 20. A transversely oriented, liquid cooled, internal combustion engine 24 (FIG. 3) is mounted within the walled enclosure 18.

As best seen in FIG. 3, engine 24 has a rotatable fan 26 connected thereto and driven thereby. A generally rectangular radiator 28 is mounted proximate to the fan 26 and includes conventional hoses (not shown) for conducting cooling fluid to and from the engine 24. The radiator 28 includes a heat exchanger portion and defines front and rear planar faces 30 and 32, respectively. The radiator 28 is mounted proximate to the engine by a support assembly 34. Support assembly 34 may be connected to a support element for the engine.

A fan shroud 36 is disposed rearwardly of the rear face 32 of the radiator between the engine and the radiator. The fan shroud 36 defines a relatively large circular opening 38. Fan 26 is coaxially mounted in the shroud opening 38. As best seen in FIG. 5, the diameter of the fan is slightly smaller than the diameter of the opening 38.

Returning to FIG. 3, the walled enclosure 18 defines a relatively large, circular air inlet opening or aperture 40. Preferably, the air inlet opening 40 is defined by a rear wall 42 of the walled enclosure 18. An air plenum 44 defined by a multi-walled structure 46 directs air from the opening 40 to the front face 30 of the radiator 28.

A rotary drum-type screen or air filter 48 is mounted over the air inlet opening 40 and projects outwardly from the rear wall 42. Screen 48 has an apertured radial end wall 50 and an apertured, cylindrically shaped, peripheral wall 52. Preferably, screen 48 defines a plurality of apertures or holes which allow a large volume of environmental or ambient air to pass therethrough. Albeit capable of filtering out large elements or pieces of trash and other contaminates, the environmental air drawn in through the screen is commonly contaminated with foreign material which is carried toward the radiator in the environmental air flow.

Radiator 28 is arranged toward one end of the air plenum 44. As seen in the drawings, the walled structure 46 is designed such that the air plenum 44 has a decreasing cross sectional area in the direction of air flow. By such structure, foreign material, of sufficient surface area for its mass, carried in the environmental air will be deflected toward an outside wall of the air plenum 44.

Radiator 28 is mounted toward one end of the air plenum 44 and proximate fan 26 by the support assembly 34. Support assembly 34 preferably arranges the front face 30 of the radiator such that it is substantially orthogonal to the direction of air flow in the air plenum. In this regard, the walled structure 46 of the air plenum includes a deflector sheet 58 arranged toward a downstream end of the air plenum for directing environmental air toward the front face 30 of the radiator 28.

A salient feature of the present invention concerns the provision of air directing means for allowing foreign material in the environmental air to bypass the radiator 28 and be exhausted rearwardly of the rear face 32 thereof. In one form of the invention, and as may be best seen in FIGS. 3, 4 and 5, such bypass means includes a vertically elongated hollow housing 60. Housing 60 is secured to the radiator mounting assembly 54 by any suitable means 62 (FIG. 4) and defines an enclosed chamber 64. Chamber 64 preferably has a plurality of inlet ports 66 which open to the chamber 64 on an upstream side of radiator 28 and a plurality of outlet ports 68 which open downstream of the rear face 32 of the radiator 28. If required, grommets 70 may be provided between housing 60 and fan shroud 36.

Figure 6:
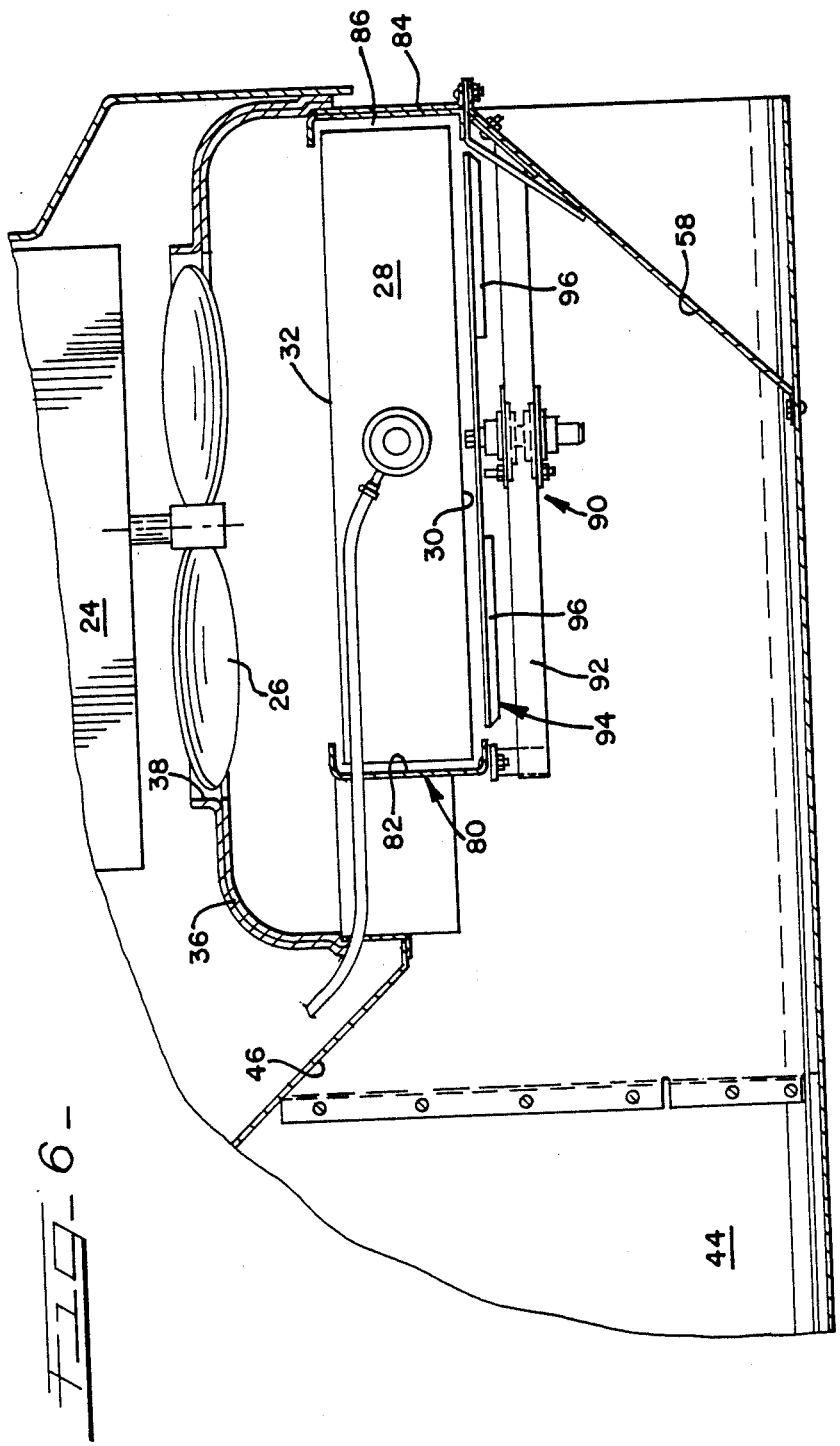
FIG. 6 is a top plan view, partially in section, illustrating details of a second embodiment of the present invention.

Referring now to FIG. 6, therein as illustrated in alternative form of radiator bypass means. For purposes of clarity and succinctness, those elements which are similar in this embodiment and which were previously described will be identified by like reference numerals.

The radiator bypass means of the second embodiment includes a radiator mounting assembly 80 which defines a radiator support channel 82. The radiator support channel 82 fixedly arranges the radiator 28 such that its front face 30 is substantially orthogonal to the direction of environmental air flow in the air plenum 44. The radiator support channel includes an upstanding wall 84 which is transversely spaced from an adjacent side of the radiator 28 so as to define a channel 86 therebetween. Channel 86 opens to the air plenum 44 upstream of the front face 30 of the radiator. Channel 86 also opens rearwardly of the rear face 32 of the radiator 28. By such construction, a bypass air flow channel is provided on at least one side of the radiator.

A freely rotatable blade assembly 90 is arranged proximate to the front face 30 of the radiator 28. The blade assembly includes a blade mounting bracket 92 which is arranged upstream of the front face of the radiator and is suitably connected to the support assemby 80 and deflector sheet 58. Any suitable means of connecting the blade mounting bracket will suffice. Mounted for free rotation on the blade mounting bracket is a fan 94. Fan 94 includes several radially extending blade portions 96 which are arranged proximate to the front face 30 of the radiator 28.

When the engine is operating, fan 26 draws a large volume of environmental air inwardly through the screened air inlet 40, into the air plenum 44 and toward the front face 30 of radiator 28. Because air plenum 44 has a decreasing cross sectional area in the direction of air flow, a venturi effect is created thereby imparting a relatively high velocity flow rate to the environmental air drawn into the air plenum 44. The high velocity environmental air passes through the radiator 28 in a heat exchanging relation and is discharged into the engine enclosure past the engine.

The openings in the screen 48 are large enough to admit a large volume of environmental air while filtering out large pieces of trash and the like. Despite the filtering effect of screen 48, the environmental air drawn into the air plenum 44 carries with it foreign material which contaminates the environmental air in the air plenum and which is drawn toward the front face of the radiator. Depending upon the level of contamination, the foreign material in the environmental air can cause a relatively rapid plugging of the front face of the radiator.

With the present invention, however, foreign material, of sufficient surface area for its mass, carried in the environmental air, will be deflected to an outside wall of the air plenum 44 because of the relatively high velocity air flow created in the plenum 44. In either form of the invention, the foreign material migrates along the deflector sheet 58, enters the bypass channel, and is ultimately, exhausted rearwardly of the rear face of the radiator. By allowing some foreign material to bypass the heat exchanger or radiator such bypass means diminishes the amount of foreign material which can plug or cause blockage of the front face of the radiator. The present invention further contemplates that the build-up of foreign material against the face of the radiator will be retarded in a manner substantially extending the core cleaning internal during operation of the combine.

The provision of blade assembly 90 upstream of the radiator 28 further enhances combine operation. That is, the freely rotating fan 94 of the blade assembly 90 is operated in response to the creation of an air flow within the air plenum. By arranging fan 94 proximate to the front face of the radiator it induces a turbulence in the air proximate the radiator's front face in a manner retarding the accumulation of foreign material on the face of the radiator and in a manner retarding foreign material from plugging the front face of the radiator.

Thus, there has been described numerous modifications and variations which can be affected with departing from the true spirit and scope of the novel concept of the present invention. It will be appreciated that the present disclosure is intended as an exemplification of the invention, and is not intended to limit the invention to the specific embodiments illustrated. The disclosure is intended to cover by the appended claims all such modifications as fall within the scope of the claims.

What is claimed is:

1. An air intake system in an agricultural implement having a mobile frame including a wall defining an air inlet opening, an internal combustion engine carried by said frame, a heat exchanger defining generally planar front and rear faces, and driven fan means arranged proximate said rear face of said heat exchanger for drawing environmental air through the air inlet opening and towards the front planar face of said heat exchanger, said air intake system comprising:

means defining an elongated air plenum for directing an environmental air flow between the air inlet opening and the heat exchanger, said air plenum means having an inlet end arranged downstream of the air inlet opening and a discharge end arranged upstream of the heat exchanger with a decreasing cross-sectional area between said ends to accelerate the air flow as it moves toward the heat exchanger, said air plenum means being further configured with an angled turn toward the discharge end thereof to facilitate a concentration of foreign material entrained with the environmental air flow drawn through the air inlet opening as the environmental air is accelerated and flows toward the heat exchanger; and means arranged adjacent to and of substantially coequal measure with one side of said heat exchanger for receiving and allowing the concentration of foreign material in the air flow drawn through the air inlet opening to bypass said heat exchanger and be exhausted rearwardly of the rear face thereof thereby inhibiting relatively rapid plugging of the heat exchanger.

2. An air intake system according to claim 1 wherein said air inlet opening in said wall is covered by a screen.

3. An air intake system according to claim 1 wherein said means for allowing environmental air to bypass said heat exchanger includes a bypass assembly secured to one side of said heat exchanger and defining a bypass chamber.

4. An air intake system according to claim 1 wherein said air plenum means is a walled structure having a decreasing cross sectional area in the direction of air flow such that foreign material in the environmental air will be deflected toward an outside wall of said structure.

5. An air intake system in a mobile agricultural implement having a frame, an internal combustion engine supported on the frame, an enclosure mounted on the frame for enclosing at least part of the engine and having walls, an air inlet in one of said enclosure walls, a fan driven by the engine for drawing environmental air inwards through the air inlet, a radiator arranged remote from said air inlet and defining front and rear generally planar vertical faces across which said environmental air passes, said air intake system comprising:

means defining an air plenum extending away from said air inlet for directing environmental air drawn into the air plenum means through the air inlet to the front face of the radiator, said air plenum means having an inlet end arranged downstream of the air inlet opening, a discharge end joined to said inlet end and arranged upstream of the front planar face of the radiator, and a decreasing cross-sectional area extending between said inlet and discharge ends for accelerating the air flow as it moves toward the radiator, said air plenum means being further configured with an angled turn toward the discharge end thereof, to facilitate a concentration of foreign material entrained with the environmental air drawn through the air inlet as the environmental air is accelerated and flows toward the radiator; and radiator support means for vertically arranging said radiator in front of said fan and toward a downstream end of said air plenum means, wherein said radiator support means defines a bypass channel of substantially coequal length with said radiator, said bypass channel being adapted to receive and allow the foreign material concentration to bypass said radiator and be exhausted downstream of the rear face of the radiator in a manner inhibiting relatively rapid plugging of the front face of the radiator.

6. An air intake system according to claim 5 wherein said air inlet is covered by a rotating screen.

7. An air intake system according to claim 5 wherein said air plenum means includes a deflector sheet arranged toward the discharge end thereof for turning the environmental air flow toward the front face of the radiator.

8. An air intake system in an agricultural implement having a mobile frame including a wall defining an air inlet opening, an internal combustion engine carried by said frame, a heat exchanger defining generally planar front and rear faces, and a driven fan operable to draw environmental air through the air inlet opening and towards the front planar face of said heat exchanger, said air intake system comprising:

means defining an elongated air plenum extending away from said air inlet for directing an environmental air flow between the air inlet opening and the heat exchanger, said air plenum having an inlet end arranged downstream of the air inlet opening, a discharge end arranged upstream of the planar front face of the heat exchanger, a decreasing cross-sectional area extending between said ends for accelerating the air flow as it moves toward the radiator, and an angled turn toward the discharge end thereof to facilitate a concentration of foreign material entrained with the environmental air flow drawn through the air inlet opening into a predetermined flow path as the environmental air is accelerated and flows toward the heat exchanger;

means for mounting said heat exchanger proximate to said fan and toward one end of said air plenum means;

means for receiving and allowing the concentration of foreign material in the predetermined flow path to bypass said heat exchanger and be exhausted rearwardly of the rear face thereof such that some foreign material is directed around the heat exchanger thereby inhibiting relatively rapid plugging of the heat exchanger; and a freely rotatable blade arranged proximate the front planar face of the heat exchanger.

9. An air intake system in a mobile agricultural implement having a frame, an internal combustion engine supported on the frame, an enclosure mounted on the frame for enclosing at least part of the engine and having walls, an air inlet in one of said enclosure walls, a fan driven by the engine for drawing environmental air inwards through the air inlet, a radiator arranged remote from said air inlet and defining front and rear generally planar faces across which said environmental air passes, said air intake system comprising:

means defining an air plenum extending away from said air inlet for directing environmental air drawn into the air plenum means through the air inlet tot he front face of the radiator, said air plenum means having an inlet end arranged downstream of the air inlet opening, a discharge end arranged upstream of the front planar face of such radiator, a decreasing cross-sectional configuration extending between and joining said ends for accelerating the air flow as it moves toward the radiator, and wherein such air plenum defines an angled turn toward the discharge end thereof, said air plenum facilitating a concentration of foreign material entrained with the environmental air drawn through the air inlet into a predetermined flow path as the environmental air is accelerated and flows toward the radiator;

radiator support means for arranging said radiator in front of said fan and toward a downstream end of said air plenum means, wherein said radiator support means defines a bypass channel which receives the concentration of foreign material in the predetermined flow path and allows the foreign material concentration to bypass said radiator and be exhausted downstream of the rear face of the radiator in a manner inhibiting relatively rapid plugging of the front face of the radiator; and a freely rotatable blade arranged proximate the front face of said radiator and which is rotated in response to an air flow in said air plenum means.

* * * * *